United States Patent [19]

Cook et al.

[11] 4,218,482

[45] Aug. 19, 1980

[54] FROZEN, NUTRITIOUS PET FOOD

[75] Inventors: C. Dale Cook, Worthington; William J. Tyznik; Peter F. DeMarco, both of Columbus, all of Ohio

[73] Assignee: Detyzco, Inc., Columbus, Ohio

[21] Appl. No.: 9,739

[22] Filed: Feb. 5, 1979

[51] Int. Cl.² .................................................. A23L 1/30
[52] U.S. Cl. .................................... 426/72; 426/567; 426/656
[58] Field of Search .................. 426/72, 656, 565, 567

[56] References Cited

U.S. PATENT DOCUMENTS

| | | | |
|---|---|---|---|
| 1,424,602 | 8/1922 | Turney | 426/565 |
| 2,608,483 | 8/1952 | Hayes | 462/72 X |
| 3,702,768 | 11/1972 | Finucane et al. | 426/656 X |

*Primary Examiner*—Arthur D. Kellogg
*Attorney, Agent, or Firm*—Frank H. Foster

[57] ABSTRACT

A frozen pet food having the appearance, texture, consistency and temperature of ice cream, but which is nutritionally complete, healthful and unusually appetizing for the pet and methods for making the pet food. The pet food comprises a frozen homogeneous mixture of approximately one-third water and oil, approximately one-third minute gas bubbles and approximately one-third a mixture of a high protein source, animal fat, vitamins and minerals and peptizing and emulsifying agents therefor. The preferred oil is corn oil and the preferred protein source is dried whey, whey product, dried skim milk, casein and milk albumen. The pet food is made by grinding the high protein source, animal fat, emulsifying and peptizing agents, vitamins and minerals into very fine particles appropriate for forming a colloidal suspension in water, mixing the ground particles, oil and water, whipping air into the mixture, pouring the whipped mixture into individual serving sized containers and freezing the mixture.

9 Claims, No Drawings

FROZEN, NUTRITIOUS PET FOOD

TECHNICAL FIELD

This invention relates to animal feeds and nutrition, and more particularly relates to a pet food which is nutritious, highly appealing to the appetite of a pet and has the appearance, texture, consistency and temperature of ice cream. The preferred embodiment of the invention is particularly formulated for dogs.

BACKGROUND ART

Dog owners, lovers and fanciers often enjoy giving their pet a special treat as much as the dogs enjoy receiving the treat. The owner may be motivated by a desire to express their affection for their pet or they may give their pet such a treat as a reward for some special activity. Often ice cream, which is a product intended for human consumption, is the treat which is given to dogs. Dogs find it very appetizing.

Ice cream as a pet treat has two very important advantages. It is a treat to humans and it is similarly a treat which dogs enjoy. The dog owner thereby can understand and somewhat participate in the enjoyment which the dog receives from the ice cream. It is human nature to feed a dog a food which humans enjoy in the belief that what is particularly appetizing for man will also be particularly appetizing for "man's best friend".

Although dogs love its coldness and creamy consistency, ice cream unfortunately is not nutritious for a dog and can lead to unhealthy conditions. For example, feeding ice cream may dilute a dog's regular diet by acting as a substitute for nutritious feed, thereby reducing the dog's intake of its nutritious feed. Additionally, the high sugar content of ice cream will tend to cause diarrhea if the dog consumes excessive amounts.

There is, therefore, a need for a pet food which can satisfy the normal human psychological desire to give a treat to a pet, which is a particularly appetizing treat for the pet and yet, which is nutritionally healthful and valuable to the pet.

The prior art contains a great variety of pet feeds as well as a great variety of frozen products such as ice cream, ice milks, etc., which are intended for human consumption. Not only is a frozen and nutritious pet food currently unknown, but a pet food which has the composition and which is manufactured according to the methods of the present invention, is entirely unknown.

A typical example of such pet foods is shown in U.S. Pat. No. 3,908,025. Another pet food is shown in U.S. Pat. No. 3,595,666.

Ice cream has, of course, been known for decades. However, because of its expensive cost and its popularity, several ice cream substitutes or imitation ice creams have also been developed. Examples of these are shown in U.S. Pat. Nos. 3,914,441, 3,345,185, 3,003,882 and 2,658,831.

BRIEF DISCLOSURE OF INVENTION

The invention is a pet food which is one pet food product simultaneously exhibits the characteristics of being very high in nutritional value, having a universally high appetite appeal for pets and having an appetizing appearance to the humans who purchase pet food. The latter factor is important because if the owner doesn't buy it, the pet doesn't get to eat it. The pet food of the present invention has the appearance and texture of ice cream.

The pet food of the present invention comprises a frozen mixture of water, and dispersed in the water, an essentially homogeneous mixture of oil, minute gas bubbles, peptizing and emulsifying agents and a dispersed mixture of a high protein source, animal fat, vitamins and minerals, each component dispersed in colloidal, emulsion or solution form.

The pet food is manufactured by grinding and mixing the high protein source, animal fat, emulsifying and peptizing agents, vitamins and minerals into very fine particles appropriate for forming a colloidal suspension in the water. The fine powder formed in this manner is mixed with oil, water and minute air bubbles into a substantially homogeneous mixture by whipping these components together to simultaneously mix the components and whip in the air. The mixture is then frozen.

BEST MODE FOR CARRYING OUT THE INVENTION

The pet food embodying the present invention is manufactured by preparing a dry base mixture of a high protein source, animal fat, vitamins, minerals, and peptizing and emulsifying agents. The dry mixture is ground into a fine powder and mixed with water and oil. The mixture is then agitated, beat or whipped to create a suspension of minute gas bubbles within the mixture. Then the entire mixture is poured into containers of a size appropriate for single servings, for example, three ounce heat sealed plastic cups, and frozen. The product may be marketed in convenient eight packs of these cups and displayed in a freezer in the retail store. We turn now to the details of the composition and of the method of manufacturing the pet food of the present invention.

The high protein source of the present invention is a mixture of several kinds of protein materials to provide the necessary quantity of digestable protein at a reasonable cost without causing health problems to the pet. The preferred protein components of the preferred high protein source of the present invention and their preferred proportions of the total dry base mixture by weight are substantially as follows:

| | |
|---|---|
| Dried Whey | 12% |
| Whey Product (whey with lactose removed) | 18% |
| Dry Skimmed Milk | 30% |
| Casein | 5% |
| Milk Albumen | 3% |

The dry base mixture further contains dried, ground animal fat which is included to provide the pet with a source of energy. Preferably, the animal fat is included as 21.5% of the dry mix by weight.

Vitamins and minerals are also added as a part of the dry base mix. Preferably this is done by forming a vitamin premix. In making the premix, Vitamin A is added as Vitamin A acetate. This and the Vitamins $D_3$ and E are mixed with dry powdered milk to obtain a homogeneous distribution of them. These components are mixed in the following proportions in the amounts shown to obtain 4 lbs. of vitamin premix.

| | | |
|---|---|---|
| Vitamin A Acetate | .031% | (0.516 gm - 1,500,000 I.U.) |

-continued

| | | |
|---|---|---|
| Vitamin D$_3$ | 0.00000413% | (0.0075 gm - 300,000 I.U.) |
| Vitamin E | 0.055% | (1 gm - 1000 I.U.) |
| Powdered Milk | 36.95% | (671.3 gm) |
| Vitamin B$_{12}$ | 0.000062% | (0.001135 gm) |
| Folic Acid | 0.87% | (15.8 gm) |
| Choline Chloride | 50.65% | (918.29 gm) |
| Riboflavin | 8.87% | (161.12 gm) |
| Niacin | 1.38% | (25.02 gm) |
| Calcium Pantothenate | 1.17% | (21.25 gm) |
| Thiamine Mononitrate | 0.021% | (0.38 gm) |

This vitamin premix is included as 4% by weight of the dry base mix.

A mineral premix of the following proportions is also made using dry powdered milk as a carrier for homogeneous mixture of the minerals. The premix is made by mixing the following materials in the following proportions. The amounts needed for a 5 pound batch are also shown.

| | | |
|---|---|---|
| Calcium Carbonate | 11.2% | (254 gm) |
| Ferrous Sulphate | 4.41% | (100 gm) |
| Copper Sulphate | 1.69% | (38.4 gm) |
| Cobalt Sulphate | 0.441% | (10.0 gm) |
| Zinc Oxide | 1.82% | (41.2 gm) |
| Manganese Oxide | 2.79% | (63.2 gm) |
| Dicalcium Phosphate | 20.77% | (471. gm) |
| Magnesium Oxide | 2.38% | (54. gm) |
| Potassium Chloride | 2.82% | (64. gm) |
| Ethylene Diamine Dihydroiodide | 0.19% | (4.4 gm) |
| Powdered Milk | 51.49% | (1167.80 gm) |

The mineral premix is preferably 5%-6% by weight of the dry base mix.

Also added as a part of the dry base mix are emulsifying and peptizing agents as follows:

Lecithin as an emulsifying agent added in the amount of 0.2% by weight for maintaining the fat, including the oil subsequently described, in suspension;

Sodium Silicoaluminate as a peptizing agent in the amount of 2% by weight is added for keeping the protein in suspension;

Polyoxy-Ethylene Glycol 400 Mono and Di Oleates are added in the amount of 1% by weight as an emulsifying and defoaming agent for emulsifying the fat and the vitamins A, D and E. The other vitamins and the minerals are dissolved and therefore dispersed in solution.

Finally, BHA is added as a preservative in the conventional manner and chlorotetracycline is an antibiotic added in the amount of 50 grams per ton of dry base mix to inhibit microbial growth.

The dry base mix is completed by blending together the above components in dry form and grinding the blend into a very fine, dry powder. The dry base mix is ground, for example, to a particle size to pass through a 300 mesh screen. It is ground uniformly to this particle size for two reasons: First, the particles must be sufficiently small that they are capable of forming a colloidal suspension when later mixed with water. Larger particles are difficult to keep in suspension. Secondly, the particle size of all the components in the base mix is desirably substantially identical in order to minimize or eliminate the settling out of some of the components during storage or transportation which would destroy the homogeneity of the dry mix. After blending and grinding, the dry mix may be used immediately for preparing a pet food product in accordance with the present invention or in the alternative, may be packaged in sacks or other containers for later use and/or transportation to other manufacturing locations.

The powdered dry base mix is then mixed with an approximately equal quantity of water and with oil in a proportion of approximately 1% by weight of the total water and dry base mix mixture. This may conveniently be done by placing the water in a Hobart mixer and adding the dry mix and oil thereto while mixing them together.

We have found that if less than 1% oil is used the product loses its creaminess and begins to exhibit crystalization. If more than 1.2% oil is used the oil begins to separate. At 1.5% oil a distinct oil/water interface is clearly visible.

The preferred mixture by weight is:

| | |
|---|---|
| Dry Base Mix | 45.5% |
| Water | 53.3% |
| Oil | 1.2% |

The preferred oil is corn oil. Although safflower oil could also be used because it is high in polyunsaturated fat, it is not preferred because it is considerably more expensive. Other oils should not be used because they suffer various disadvantages. For example, cottonseed oil contains ingredients which are undesirable for skin conditions of a pet. The corn oil not only provides additional energy but also improves the dog's appearance by giving a lustrous sheen to its coat.

Minute gas bubbles, most conveniently air bubbles, are then introduced into and homogeneously dispersed throughout this mixture to create a light, soft product. The required air is conveniently introduced into the mixture by continued operation of the Hobart mixer to whip the product into approximately a 50% overrun, i.e., approximately one-third of the volume is air. This mixture is then frozen.

Preferably, the mixture is poured into individual, plastic, serving containers which are sealed and then the contents are frozen. These containers mold the product for freezing and are convenient marketing and serving containers.

The product made in this manner has the appearance and feel of ice cream and does not freeze into unpleasant large ice crystals which are uncharacteristic of ice cream. The product does not dilute the animal's regular diet. In fact, it augments the diet because it is at least as nutritious as the regular dog food which may be displaced by it, containing all of the vitamins, minerals, protein and energy for maintenance of good health, appearance and function.

A pet food product made in the preferred proportions would have the following guaranteed analysis and specifications:

| Guaranteed Analysis | |
|---|---|
| Crude Protein | 26% |
| Crude Fat | 20% |
| Crude Fiber | 1.0% |
| Vitamin A | 15,000 units per pound |
| Vitamin D$_3$ | 3,000 units per pound |
| Vitamin E | 10 units per pound |
| Chlorotetracycline | 50 grams per ton |

| Specifications | | |
| --- | --- | --- |
| Dry Matter | 97% | |
| Ash | 8.2% | |
| Ca | .91% | |
| P | .70% | |
| K | 1.60% | |
| Mg | .17% | |
| Fe | 97.9 | milligrams/Kg |
| Ca | 1.24 | milligrams/Kg |
| Cu | 45.5 | milligrams/Kg |
| Mn | 101.5 | milligrams/Kg |
| Io | 10.3 | milligrams/Kg |
| Zn | 65.0 | milligrams/Kg |
| Thiamine | 8.5 | milligrams/Kg |
| Riboflavin | 35.5 | milligrams/Kg |
| $B_6$ | 6.3 | milligrams/Kg |
| $B_{12}$ | 29.0 | micrograms/Kg |
| Pantothenic | 46.8 | milligrams/Kg |
| Niacin | 55.1 | milligrams/Kg |
| Folic acid | 3.5 | milligrams/Kg |
| Biotin | .5 | milligrams/Kg |
| Choline | 20,202.4 | milligrams/Kg |

While the above ingredients are disclosed in their preferred proportions, some variations in these proportions are permissible without departing from the spirit of the invention. However, we have found that substantial departure from the following ranges leads to improper product appearance, undesirable consistency and texture, and dietary deficiencies or may induce minor health problems such as diarrhea.

The components of the dry base mixture as a proportion of the dry base mixture may be varied within the following ranges:

| | |
| --- | --- |
| Fat | 21%–22% |
| Dried Whey | 13%–14% |
| Whey Product | 15%–20% |
| Skimmed Milk | 30%–30% |
| Casein | 4%–6% |
| Milk Albumen | 2%–4% |
| Vitamin Premix | 4%–4% |
| Mineral Premix | 5%–6% |

The dry base mixture having components in the above ranges is mixed with the water and oil as described in amounts which may vary within the following ranges:

| | |
| --- | --- |
| Dry Base Mix | 40%–46% |
| Water | 53%–59% |
| Oil | 1%–1.2% |

If the proportion of dry base mix exceeds substantially 46% the creamy texture is lost, sufficient air can't be whipped in and the fatty components can not be homogeneously distributed. With less than 40% dry base mix, distribution is not homogeneous and an undesirable layer forms on top of the product similar to the layer which forms on pudding.

The extent of the highly palatable nature of the pet food made in accordance with the present invention is illustrated by an experiment which was performed using dogs. Ordinarily animals, like humans, which have undergone surgery have no interest in eating immediately after the surgery is completed. This is because surgery is a considerable trauma to the animal and because the animal is still under the influence of an anesthesia. Usually such post-operative animals will eat nothing. However, pet food products made in accordance with the present invention were offered to eighteen such post-operative dogs at a local veterinary clinic. Each dog consumed the offered pet food immediately. No ill effects were observed.

Thus, it can be seen that a pet food in accordance with the present invention has an unusually advantageous balance of cost, appetite appeal, nutritional value and absence of ill effects.

The following are sample formulations of the Dry Base Mixture for pet foods made in accordance with the present invention:

EXAMPLE I

| | |
| --- | --- |
| Fat | 21% |
| Dried Whey | 13% |
| Whey Product | 20% |
| Skimmed Milk | 30% |
| Casein | 4% |
| Milk Albumen | 2% |
| Vitamin Premix | 4% |
| Mineral Premix | 6% |
| | 100% |

EXAMPLE II

| | |
| --- | --- |
| Fat | 22% |
| Dried Whey | 14% |
| Whey Product | 15% |
| Skimmed Milk | 30% |
| Casein | 6% |
| Milk Albumen | 4% |
| Vitamin Premix | 4% |
| Mineral Premix | 5% |
| | 100% |

The following are examples of proportions in which a Dry Base Mixture made in accordance with the present invention may be mixed with water and oil:

EXAMPLE III

| | |
| --- | --- |
| Dry Base Mix | 45.5% |
| Water | 53.3% |
| Corn Oil | 1.2% |

EXAMPLE IV

| | |
| --- | --- |
| Dry Base Mix | 40% |
| Water | 59% |
| Corn Oil | 1% |

We claim:

1. A pet food comprising:
a frozen, substantially homogeneous mixture of water and, dispersed in said water, emulsified oil, minute gas bubbles, peptizing and emulsifying agents, colloidal particles of high protein source, emulsified, unsaturated animal fat, and emulsified and dissolved vitamins and minerals and having essentially no added sugar component.

2. A pet food in accordance with claim 1 wherein the proportions of said non-gas components of said mixture are by weight substantially within the ranges:

| | | |
|---|---|---|
| water | 53% to | 59% |
| oil | 1% to | 1.2% | all other of said components 40% to 46%.

3. A pet food in accordance with claim 1 wherein said oil consists essentially of corn oil and said high protein source comprises a mixture of dried whey, whey product, dried skim milk, casein and milk albumen.

4. A pet food in accordance with claim 1 or claim 3 wherein said mixture comprises substantially one-third of its volume as said gas bubbles.

5. A pet food in accordance with claim 3 wherein said water is substantially within the range of 53% to 59% by weight and said oil consists essentially of corn oil in an amount substantially within the range of 1% to 1.2% by weight; wherein said vitamins are substantially within the range of 1.6% to 1.84% by weight and said minerals are substantially within the range of 1.6% to 2.3% by weight; wherein said high protein source comprises the following components within the following proportionate ranges by weight of said pet food: dried whey 5.2% to 6.5%; whey product 6% to 9.2%; dried skim milk 12% to 13.8%; casein 1.6% to 2.8%; and milk albumen 0.8% to 1.85%; and wherein said animal fat is substantially within the range of 8.4% to 10.0% by weight.

6. A pet food in accordance with claim 5 wherein said mixture comprises substantially one-third of its volume as said gas bubbles.

7. A pet food in accordance with claim 1 wherein said high protein source comprises the following components in substantially the following proportions:

| | | |
|---|---|---|
| Skimmed milk | 40.5% to | 46.9% |
| Dried Whey | 17.8% to | 21.5% |
| Whey Product | 21.7% to | 28.9% |
| Casein | 5.6% to | 9.1% |
| Milk Albumen | 2.8% to | 6.1% |

8. A method for manufacturing a pet food comprising:
 (a) grinding a dried mixture of a high protein source, animal fat, emulsifying and peptizing agents, vitamins and minerals into very fine particles appropriate for forming a colloidal suspension in water;
 (b) mixing said ground particles, oil, water and minute air bubbles into a substantially homogeneous mixture; and
 (c) freezing said mixture.

9. A method in accordance with claim 8 further comprising the step of pouring said homogeneous mixture into a plurality of individual serving mold containers prior to freezing.

* * * * *